June 12, 1962  G. R. ROOT  3,038,736
WHEEL ADJUSTMENT FOR LAWN MOWERS
Filed May 1, 1961

INVENTOR.
GEORGE R. ROOT
BY
*Fishburn & Gold*
ATTORNEYS

United States Patent Office 3,038,736
Patented June 12, 1962

3,038,736
WHEEL ADJUSTMENT FOR LAWN MOWERS
George R. Root, Baxter Springs, Kans., assignor to Root Manufacturing Company, Inc., Baxter Springs, Kans., a corporation of Kansas
Filed May 1, 1961, Ser. No. 106,601
3 Claims. (Cl. 280—43.17)

This invention relates to lawn mowers, and more particularly to mechanism mounting each wheel of the mower for adjustment of the cutting height of the mower.

It is well known that in mowers of rotary type, there is provided a housing having depending side walls wherein a rotary blade is mounted for rotation about a vertical axis in the housing. It is common procedure to adjust the cutting height of the blade by adjusting the shaft on which the blade is mounted or by adjusting the blade on the shaft. Attempts have been made to mount the wheels on the frame for individual adjustment for adjusting the frame with respect to the ground over which the wheel travels. Such attempts have been cumbersome and have been hard to adjust.

It is the principal object of the present invention to mount the wheels on the frame through an axle pivotally mounted on the frame by bearing arms which by rotation of the arms with respect to the frame will adjust the height of the frame from the ground and thus change the cutting height of the blade.

Other objects of the present invention are to provide a frame for a lawn mower having forwardly and rearwardly extending portions having depending side walls provided with slots or cut-away portions; to provide shafts or axles upon which the wheels are mounted extending through the slots transversely of the housing; to provide bearing arms for the axles having one end pivotally mounted adjacent the slots in the depending side walls so that the axles may be raised and lowered in said slots; to provide means for holding the axles in adjusted position with respect to the housing to change the cutting height of the mower; to provide axles extending outwardly of the bearing arms upon which the wheels are mounted; to provide spring means surrounding the axles outwardly of the bearing arms; to provide a stop for the outer end of the spring means, such as a washer and cotter key to hold the bearing arm in aligned position alongside the depending side wall of the frame to hold the adjusting means in place, and to provide a device of this character simple and economical to manufacture.

Other objects and advantages of this invention will become apparent from the following description taken in connection with the accompanying drawings wherein are set forth by way of illustration and example certain embodiments of this invention.

Figure 1:
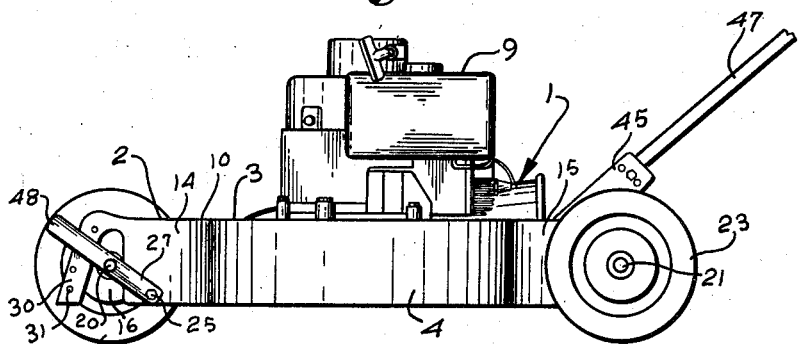
FIG. 1 is a side view of the lawn mower, particularly illustrating the mounting of the axle with the wheel removed to better illustrate the invention.
Figure 2:
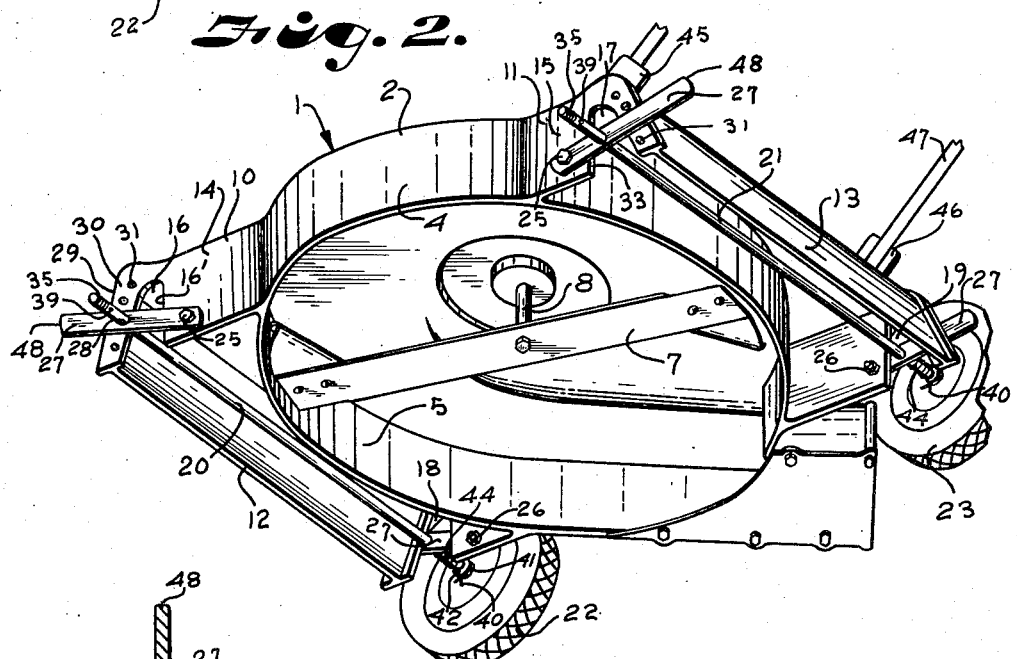
FIG. 2 is a perspective view partly fragmentary, illustrating the wheel mounting and two of the wheels removed to better illustrate the invention.

Relating more in detail to the drawings:

1 designates a lawn mower embodying the features of my invention comprising a housing 2 having a top 3 and depending sides 4 forming a ring 5 which houses the blade 7 mounted on the vertical shaft 8 which extends above the mower and is rotated by a motor 9, as is the usual practice.

The frame or housing 2 has forwardly extending portions 10 and rearwardly portions 11. The top 3 of the housing extends over and forms a forwardly depending skirt 12 and a rearwardly depending skirt 13. The forward and rearwardly extending portions of the frame having depending sides 14 and 15 provided with slots or cut-out portions 16 and 17 and 18 and 19 respectively on each side of the depending portions of the framework structure.

Axles or shafts 20 and 21 are provided upon which are mounted forward and rear wheels 22 and 23 respectively. The shafts 20 and 21 are mounted on the frames so that they may be adjusted upward or downwardly in the slots in the depending side of the frame and as each end of the shafts are mounted identically with respect to the frame, only one mounting will be described.

Spaced from the side edge 16' of the notch 16 is an opening 24 for receiving a bushing 24' for a bolt 25 having a nut 26 for pivotally mounting an arm 27 which extends forwardly of the forward depending skirt 12 of the mower. The arm 27 has an opening 28 through which the axle 20 extends and the opening forming a bearing for the axle or shaft. The slot 16 is spaced from the forward edge 29 of the depending skirt 12 forming a bracket 30 provided with a plurality of spaced openings 31 for receiving a lug 32 extending inwardly from the arm 27 and which aligns with the openings 31. The openings are placed in a slightly curved formation so that the lug will fit therein upon rotary movement of the arm 27.

The mounting of the rear axle on the arms 27 is identical, the mounting of the arms 27 being by the bolt 25 on the depending skirt 15 rearwardly of the edge 33 of the notches 17 and 19.

Figure 3:
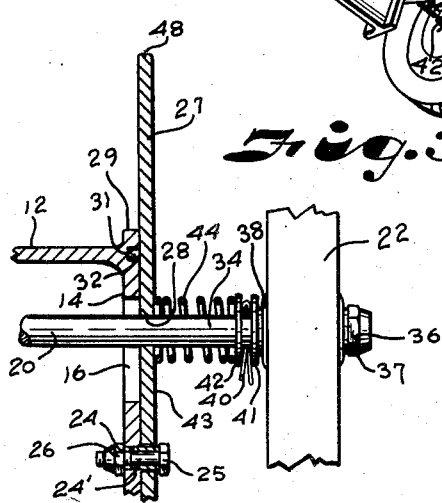
FIG. 3 is an enlarged cross-sectional fragmentary view particularly illustrating the spring means on the axle to hold the bearing arm in place.

The axles 20 and 21 extend outwardly from the sides of the mower, as indicated at 34 (FIG. 3) and the extreme outer ends are provided with threads 35. The forward and rear wheels 22 and 23 are mounted on the axles outside the housing and retained thereon by a lock nut 36. The wheels include hub portions 37 and 38 forming a bearing for rotation of the wheels about the shaft. The lock nut 36 will prevent their becoming loosened by vibration of the mower.

The outer extension 34 of the axle is provided with transverse openings 39 for a cotter key or the like 40 and mounted on the axles on each side of the cotter key are washers 41 and 42. Mounted on the shafts between the washer 42 and the side 43 of the arm 27 are coil springs 44 for exerting pressure against an arm to retain the arm alongside the depending side walls of the frame and the lug 32 engages in an opening 31 of the brackets 30. The washer 42 and cotter key prevents pressure of the spring against the hub of the wheel. With this arrangement the wheel will rotate about the outer end portion 34 of the axles and there will be very little rotation of the axle in the bearing openings 28 of the arms 27.

The frame 2 includes upwardly and rearwardly inclined brackets 45 and 46 for a handle 47 for manipulating the mower.

In order to change the height of the cutting blade of the mower, the outer end 48 of each arm is moved laterally outwardly away from the frame to disengage the lug 32 from a bracket opening 31 and then to lower the frame toward the ground the arm is moved upwardly and the lug engaged in one of the upper openings. To raise the frame the reverse is required and the lug engaged in a lower opening.

It will be obvious from the foregoing that I have provided an improved mounting for the wheels of a mower of this character, wherein the wheels may be mounted on axles pivotally mounted on the frame for adjustment of the frame vertically with respect to the wheels to raise or lower the cutting blade of the mower with respect to the ground over which the mower travels.

It is to be understood that while I have illustrated and described one form of my invention, it is not to be limited to the specific form or arrangement of parts herein described and shown except insofar as such limitations are included in the claims.

I claim:

1. In a lawn mower, the combination of a housing, having depending spaced side walls and forward and rear ends, said side walls being provided with vertical slots spaced from the forward and rear ends of the housing forming depending brackets at each corner of the housing, forward and rear axles extending through said slots and extending outwardly of said side walls, wheels mounted on the outer ends of said axles spaced from said side walls, arms pivotally mounted on said depending side walls spaced from said slots, said arms having openings therein through which said axles extend, means on said arms cooperating with means on said side walls spaced from said slots to hold the arms engaged with said housing and the wheels in adjusted relation to said housing, said outwardly extending portions of said axles having transverse openings, keys in said openings, a washer on one side of said keys, and a coil spring on each of said axles between said arms and said washer to exert pressure on said arms to retain the arms in engagement wtih said housing.

2. In a lawn mower, the combination of a housing, having forwardly and rearwardly extending portions having depending spaced side walls, said side walls being provided with vertical slots spaced from the forward and rear ends of the housing forming depending brackets at each corner of the forwardly and rearwardly extending portions, said brackets having spaced openings therein adjacent said slots, forward and rear axles extending through said slots transversely of the housing and outwardly of said side walls, wheels mounted on the outer ends of said axles, arms pivotally mounted on said depending side walls spaced from said slots, said arms having openings therein through which said axles extend, lugs on said arms extending toward and engageable in said openings in said brackets, said wheels being spaced outwardly of said arms, stop means on said axles spaced from said arms and adjacent said wheels, and means on each of said axles between said arms and said stop means to exert pressure on said arms to retain the lugs engaged in said openings in said brackets.

3. In a lawn mower, the combination of a housing, having forwardly and rearwardly extending portions having depending spaced side walls, said side walls being provided with vertical slots spaced from the forward and rear ends of the housing forming depending brackets at each corner of the forwardly and rearwardly extending portions, said brackets having spaced openings therein adjacent said slots, forward and rear axles extending through said slots transversely of the housing and outwardly of said side walls, wheels mounted on the outer ends of said axles, arms pivotally mounted on said depending side walls spaced from said slots, said arms having openings therein through which said axles extend, lugs on said arms extending toward and engageable in said openings in said brackets, said wheels being spaced outwardly of said arms, said outwardly extending portions of said axles having transverse openings, keys in said openings, washers on each side of said keys, and a coil spring on each of said axles between said arms and one of said washers to exert pressure on said arms to retain the lugs engaged in said openings in said brackets.

References Cited in the file of this patent

UNITED STATES PATENTS

| | | |
|---|---|---|
| 2,617,670 | Welsh | Nov. 11, 1952 |
| 2,818,270 | Cataline | Dec. 31, 1957 |